(12) United States Patent
Hyatt

(10) Patent No.: US 6,195,659 B1
(45) Date of Patent: *Feb. 27, 2001

(54) METHOD AND APPARATUS FOR MORPHOLOGICAL CLUSTERING HAVING MULTIPLE DILATION AND EROSION OF SWITCHABLE GRID DATA CELLS

(75) Inventor: Martin Henry Hyatt, Sunnyvale, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/115,788

(22) Filed: Jul. 14, 1998

(51) Int. Cl.⁷ ................................................. G06F 17/30
(52) U.S. Cl. ............................... 707/7; 382/128; 707/100
(58) Field of Search ...................... 707/7, 100; 382/128

(56) References Cited

U.S. PATENT DOCUMENTS

| | | | |
|---|---|---|---|
| 4,833,610 | * 5/1989 | Zamora et al. | 707/5 |
| 5,619,592 | * 4/1997 | Bloomberg et al. | 382/175 |
| 5,796,861 | * 8/1998 | Vogt et al. | 382/128 |
| 5,850,464 | * 12/1998 | Vogt | 382/128 |
| 5,960,127 | * 9/1999 | Davis | 382/308 |

OTHER PUBLICATIONS

Computer–Oriented Approaches to Pattern Recognition, William S. Meisel, Academic Press (1972), pp. 138–140.*
*Multivariate Observations*, G.A.F. Seber, John Wiley & Sons (1981), pp. 347–349.

* cited by examiner

Primary Examiner—Thomas G. Black
Assistant Examiner—William Trinh
(74) Attorney, Agent, or Firm—Michael S. Yatsko

(57) ABSTRACT

A technique for automatically identifying clusters of data from a set of data samples, by employing multiple morphological operations of a grid of data cells representative of the data samples. The data samples are stored (12) in the data cell grid (56) as binary quantities of which the position in the grid represents each multivariate data point. Potential cluster regions are identified by first performing a series of dilation steps (22) on the data grid, to expand contiguous regions covered by the data points until smaller regions merge into larger ones that are identified as the potential cluster regions. Then a series of erosion operations (26) is performed, shrinking the contiguous regions until smaller isolated regions are completely eliminated and thin linkages between other potential cluster regions are removed. Next, a further series of dilation operations (30) expands the contiguous regions again, to reconnect any potential cluster regions that were fragmented in the erosion operations. Each remaining contiguous region of data cells is defined as a cluster. Data points falling within a cluster are said to belong to that cluster (36) and may share at least some attributes because their defining parameters are so similar.

16 Claims, 14 Drawing Sheets

*SPANNING TREE WITH DISTANCE HISTOGRAM ANALYSIS

METHOD AND APPARATUS FOR MORPHOLOGICAL CLUSTERING HAVING MULTIPLE DILATION AND EROSION OF SWITCHABLE GRID DATA CELLS

BACKGROUND OF THE INVENTION

This invention relates generally to multivariate statistical analysis and, more specifically, to clustering techniques used to analyze statistical data. Clustering is also known by the terms unsupervised learning, and categorization. Prior art clustering techniques include the spanning tree method and the expectation-maximization method.

Clustering is based on the reasonable assumption that things having similar attributes also have similar measured characteristics. For example, biologists may categorize biological specimens based on their measured characteristics, which may be plotted in an n-dimensional grid. Specimens with similar measured characteristics falling into a statistical "cluster" of data points on the grid may be defined as belonging to a specific category of biological entity.

A similar analysis may be used to categorize stocks traded in a stock market. The measured characteristics may include share price, price-to-earnings ratio, price volatility, and so forth. When various stocks are sampled and their characteristics are plotted on an n-dimensional grid, categories of stocks emerge from the resulting clustering of patterns of data points. Such categories may be used to identify candidate stocks for purchase or sale.

Clustering techniques can be used in a variety of other fields, including signal analysis and identification, pattern recognition, geological resource exploration, marketing research, and identification of persons by analysis of fingerprints, voice patterns, retinal patterns, or some other form of biometric analysis. Clustering techniques encounter two key problems that are common to all of these applications: cluster proximity and cluster count. In particular, it is sometimes difficult to separate and distinguish clusters that are close together and may appear to overlap. Moreover, there may be some measured data points that do not fall clearly within cluster regions that have already been identified, and these raise the issue of whether to ignore the new data points, or to include them in a selected existing cluster, thereby, perhaps, extending the boundaries of the cluster, or to define a new cluster. Some clustering techniques require knowledge of the number of clusters, which is often not known and is difficult to determine. Other clustering problems include inhomogeneity of cluster density of size, and clusters of unusual shapes, such as crescents or rings. Another practical difficulty inherent to available clustering techniques is that the processing time needed is proportional to the number of data points squared, cubed, or raised to some other power. For example, the spanning tree algorithm used for clustering has a processing time proportional to $N^3$, where N is the number of data points being analyzed. The spanning tree approach has the additional drawback that it cannot easily distinguish between categories that are too close together.

Because clustering has such a diverse range of applications, there is clearly a need for a new approach to clustering that can handle larger numbers of data points and categories, and can handle categories that may otherwise be statistically indistinguishable. The present invention is directed to this end.

SUMMARY OF THE INVENTION

The present invention resides in a clustering system and method that uses morphological techniques to analyze multivariate statistical data and to derive therefrom data defining clusters into which the original data points fall. Briefly, and in general terms, the method of the invention comprises the steps of storing the data in the form of a grid of data cells, each of which is switchable to a state representing a data point, the grid having as many dimensions as the multivariate statistical data; and performing multiple morphological operations on the grid of data cells to identify one or more clusters of data.

More specifically, the step of performing multiple morphological operations includes performing multiple dilation steps to expand contiguous regions of the grid covered by data points until adjacent sub-regions merge into larger regions identified as potential clusters; then performing multiple erosion steps to shrink the potential clusters until isolated smaller ones are eliminated and thin linkages between other potential clusters are removed; and then performing further multiple dilation steps to reconnect any potential clusters that were fragmented by the previous step, to leave clusters of data cells. Data points falling within the boundaries of a cluster are said to belong to that cluster and may share at least some attributes.

Each dilation step includes turning each data cell to an "on" condition if any immediately adjacent neighbor cell is already in the "on" condition. Each erosion step includes turning each data cell to an "off" condition if any immediately adjacent neighbor cell is already in the "off" condition. In the presently preferred embodiment of the invention, the step of performing multiple dilation steps includes performing M such steps; and the step of performing multiple erosion steps includes performing M+1 such steps. Finally, the step of performing further multiple dilation steps includes performing N such steps. In the specifically disclosed embodiment discussed further below, M is three and N is four, so there are three initial dilation steps, followed by four erosion steps and then four further dilation steps.

After the clusters have been defined, the method includes the further steps of identifying the data cells in each cluster; and identifying data points that fall within the boundaries of each cluster.

The invention may also be defined as a method for automatically categorizing samples of multivariate statistical data based on whether the samples fall into clusters, the method comprising the steps of storing data samples in the form of a multidimensional grid of data cells, each of which can be switched to a state representing a data point by its position in the grid; performing multiple morphological dilation steps to expand contiguous regions of the grid covered by data points, until adjacent regions merge into larger regions identified as potential cluster regions; then performing multiple morphological erosion steps to shrink the potential cluster regions until smaller ones are eliminated and thin linkages between other potential cluster regions are removed; and then performing further multiple morphological dilation steps to reconnect any potential cluster regions that were fragmented by the previous step, leaving clusters of data cells. Data points falling within the boundaries of a cluster are said to belong to that cluster and to share at least some common attributes. The method continues with the steps of labeling the data cells in each cluster as belonging to that cluster; and labeling data points that fall within the boundaries a cluster as belonging to that cluster.

As already mentioned above, each data point is represented by a data cell in an "on" condition. Each dilation step includes turning each data cell to the "on" condition if any immediately adjacent neighbor data cell is already in the "on" condition; and each erosion step includes turning each data cell to an "off" condition if any immediately adjacent neighbor data cell is already in the "off" condition.

The invention may also be defined as a system for automatically identifying clusters in samples of multivariate statistical data, comprising a memory for storing multivariate statistical data in the form of a logical multidimensional grid of data cells, each of which is switchable to a state representing a sample data point, wherein the position of the data cell in the multidimensional grid represents multiple dimensions of the data point; and a processor programmed to perform multiple morphological operations on the grid of data cells and to thereby identify one or more clusters of data.

More specifically, the processor programmed to perform multiple morphological operations includes a first morphological processing module, for performing multiple dilation steps to expand contiguous regions of the grid encompassed by data points until adjacent sub-regions merge into larger regions identified as potential cluster regions; a second morphological processing module, for performing multiple erosion steps to shrink the potential cluster regions until isolated smaller regions are eliminated and thin linkages between other potential cluster regions are removed; and a third morphological processing module, for performing further multiple dilation steps to reconnect any potential cluster regions that were fragmented by the second morphological processing module, to leave clusters of data cells, wherein data points falling within the boundaries of a cluster are said to belong to that cluster. The system further comprises a processing module for locating each data cell that falls within the boundary of each cluster, and labeling appropriate data cells as falling within the clusters; and another processing module, for identifying each data point within the boundaries of a cluster as belonging to that cluster. The system may further include yet another processing module, for determining whether data cells not belonging to a cluster should be eliminated from consideration or assigned to a nearby cluster.

It will be appreciated from the foregoing that the present invention represents a significant advance in the field of statistical clustering techniques. In particular, the invention uses morphological processing to perform a clustering process in a novel and advantageous way. A combination of morphological dilation, erosion and further dilation steps identifies cluster regions reliably and automatically, and eliminates outlying small regions and thin connections between cluster regions. Other aspects and advantages of the invention will become apparent from the following more detailed description, considered with the accompanying drawings.

DESCRIPTION OF THE PREFERRED EMBODIMENT

Figure 1:
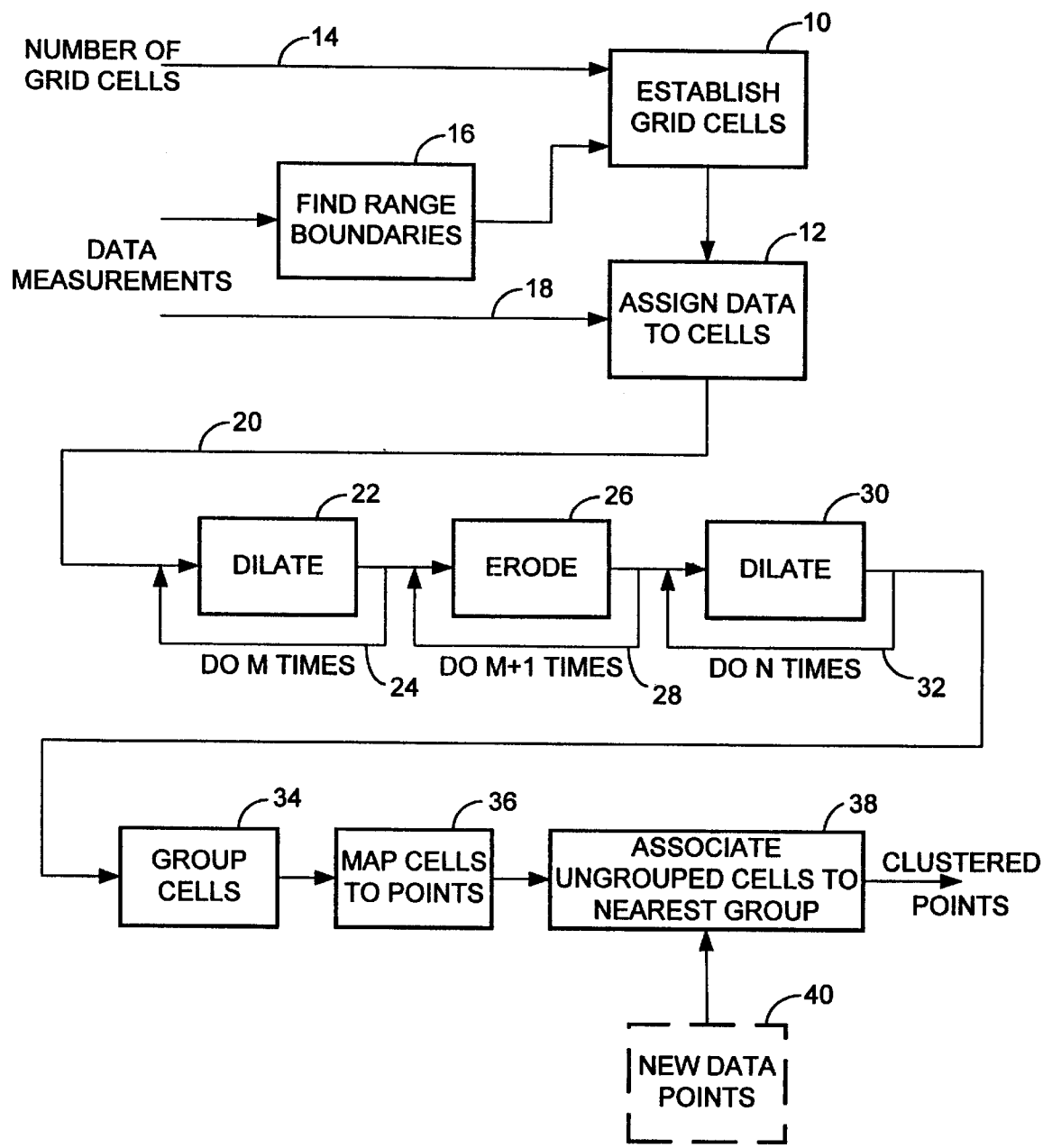
FIG. 1 is a flow diagram defining the steps performed in a morphological clustering technique in accordance with the present invention.

As shown in the drawings for purposes of illustration, the present invention uses a morphological approach to statistical clustering analysis. Morphological techniques have been used in processing waveforms and in pattern recognition methods. Basically, a morphological operation involves filtering or processing a set of data by using a sliding filter window. For example, the sliding window might provide the average of waveform ordinates over a limited range of abscissa values. As an input signal is processed by the filter window, an output signal is generated with a derivative waveform that is similar to the original but with features changed in such a way as to make the output more susceptible to analysis. For example, the window size can be chosen such that waveform features narrower than the window are affected by the process, but features wider than the window are not.

Morphological operators can also be applied to two-dimensional image data and, in general, the application of a morphological operator can be thought of as producing an output based on a geometric characteristic of the data rather than being based on an arithmetic result. For a two-dimensional grid of data, the sliding window used in applying the morphological operator may be, for example, a 3×3 window. The function of one commonly used operator is to replace the center value in the window with the minimum of all values within the window. This process is known as "erosion." The inverse of this is to replace the center value with the maximum of all values within the window; a process known as "dilation." In the special case of binary data, where the data values are each either "1" or "0," the effect of the erosion operation is to place a zero in each cell that has a neighboring zero cell. Likewise, the effect of the dilation operation is to place a one in each cell that has a neighboring cell containing a one. Morphological processing has been applied mostly in image processing, to filter out objects of a specific size, for speckle reduction, or for automated inspection processes to locate defects in products such as integrated circuits.

In accordance with the present invention, a morphological technique is used to derive clusters of data from multidimensional measurements of multiple data points. The basic steps of the method are shown in the flow diagram of FIG. 1.

Figure 4A:
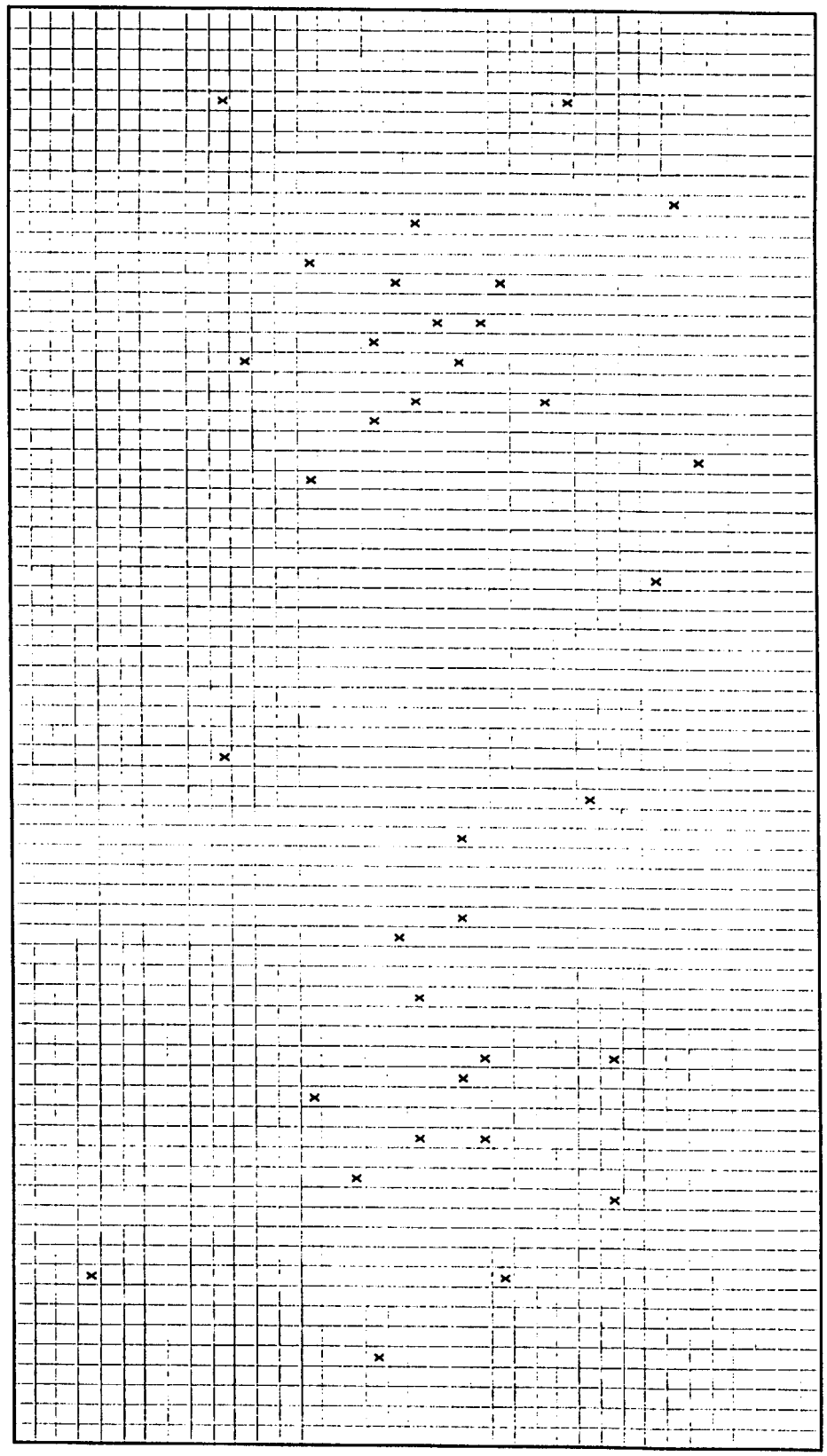
FIGS. 4A through 4K are diagrams illustrating the effect of the successive processing steps of the method shown in FIG. 1 on an illustrative set of data points in a two-dimensional grid.

Preliminary steps include data acquisition (not shown), establishing a grid of data cells, as indicated in block 10, and assigning data to the cells, as indicated in block 12. Establishing the grid of cells uses the number of available cells, indicated by input line 14, and ranges of data values in each dimension, are determined from the data measurements, as indicated in block 16. The data measurements, as indicated by input line 18 to block 12, are then used to assign data to the cells. In the disclosed configuration of the invention, each grid cell contains only a single bit of data. A data value of a particular data measurement is indicated by the position of cell containing a "1" bit with respect to a grid axis corresponding to the data measurement. For a two-dimension data grid, for example, "1" bits are placed in positions that simply plot the two-dimensional data values. All the other cells are reset to contain a "0." In essence, the grid of cells is a binary representation of a graph on which an X or other mark is placed at every data point. A single cell may plot more than one identical data point. By way of example, FIG. 4A shows a grid of cells in which the letter X is used to indicate data points corresponding to the original data measurements.

Figure 4B:
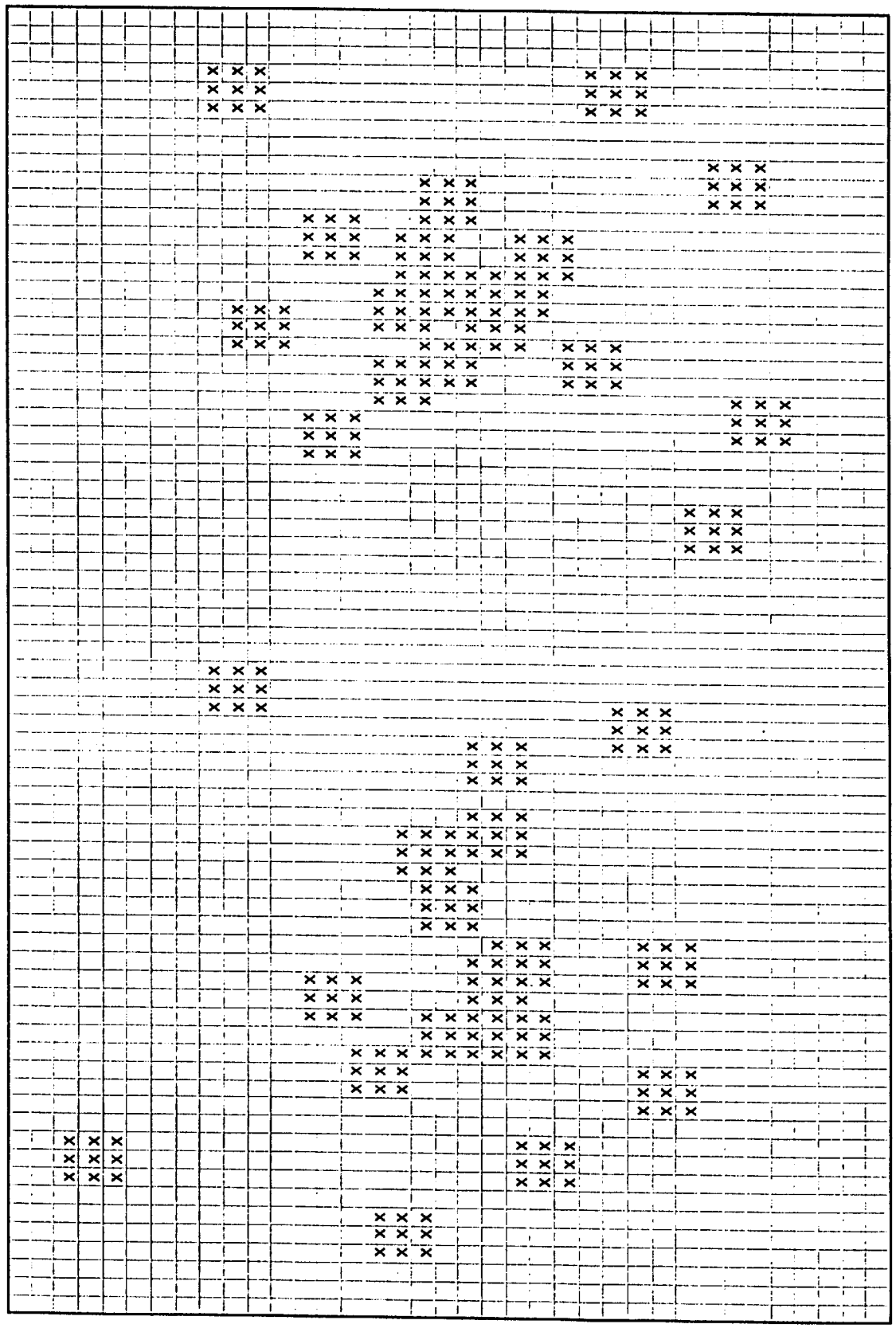
Figure 4C:
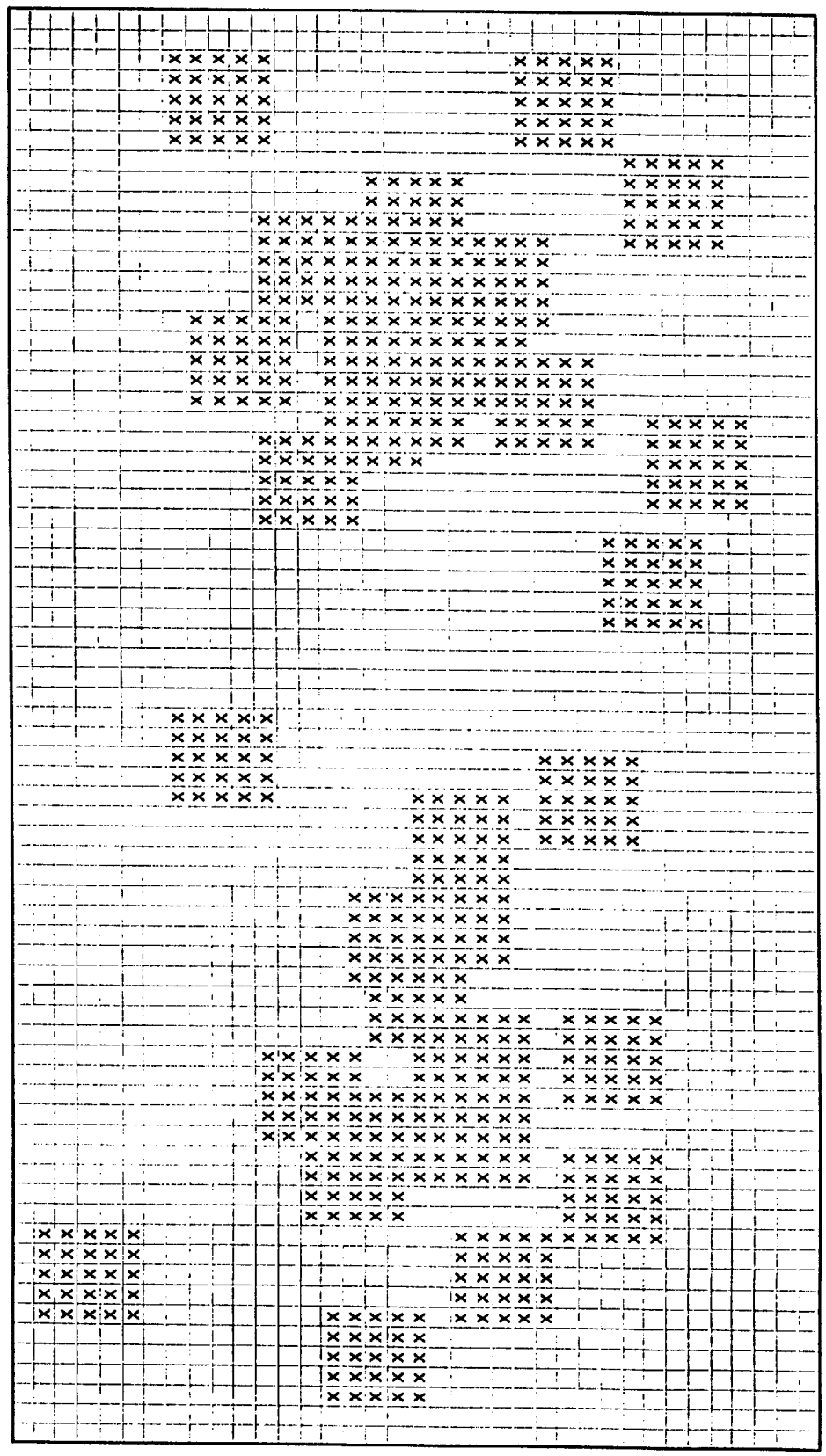
Figure 4D:
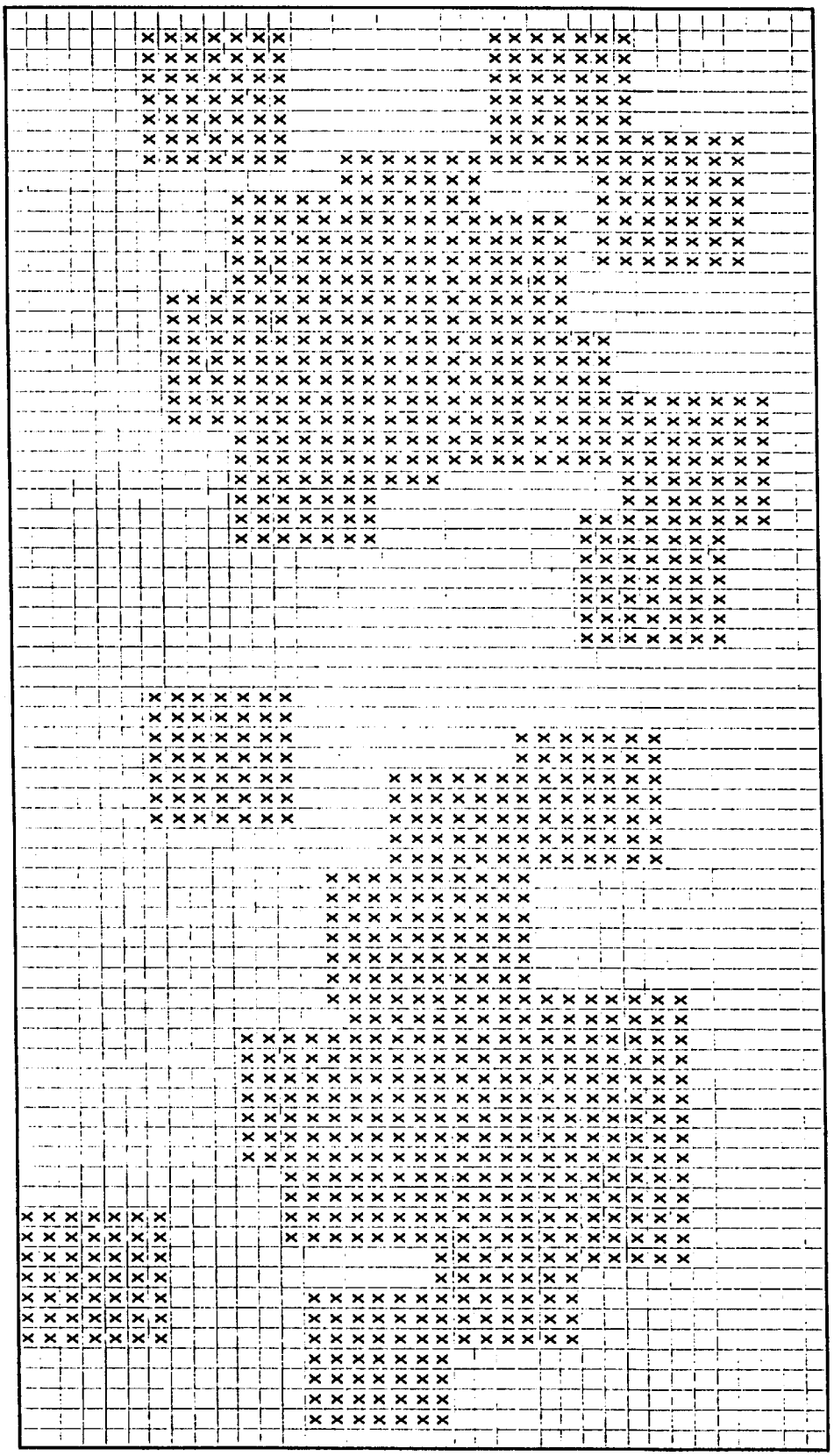
Figure 4E:
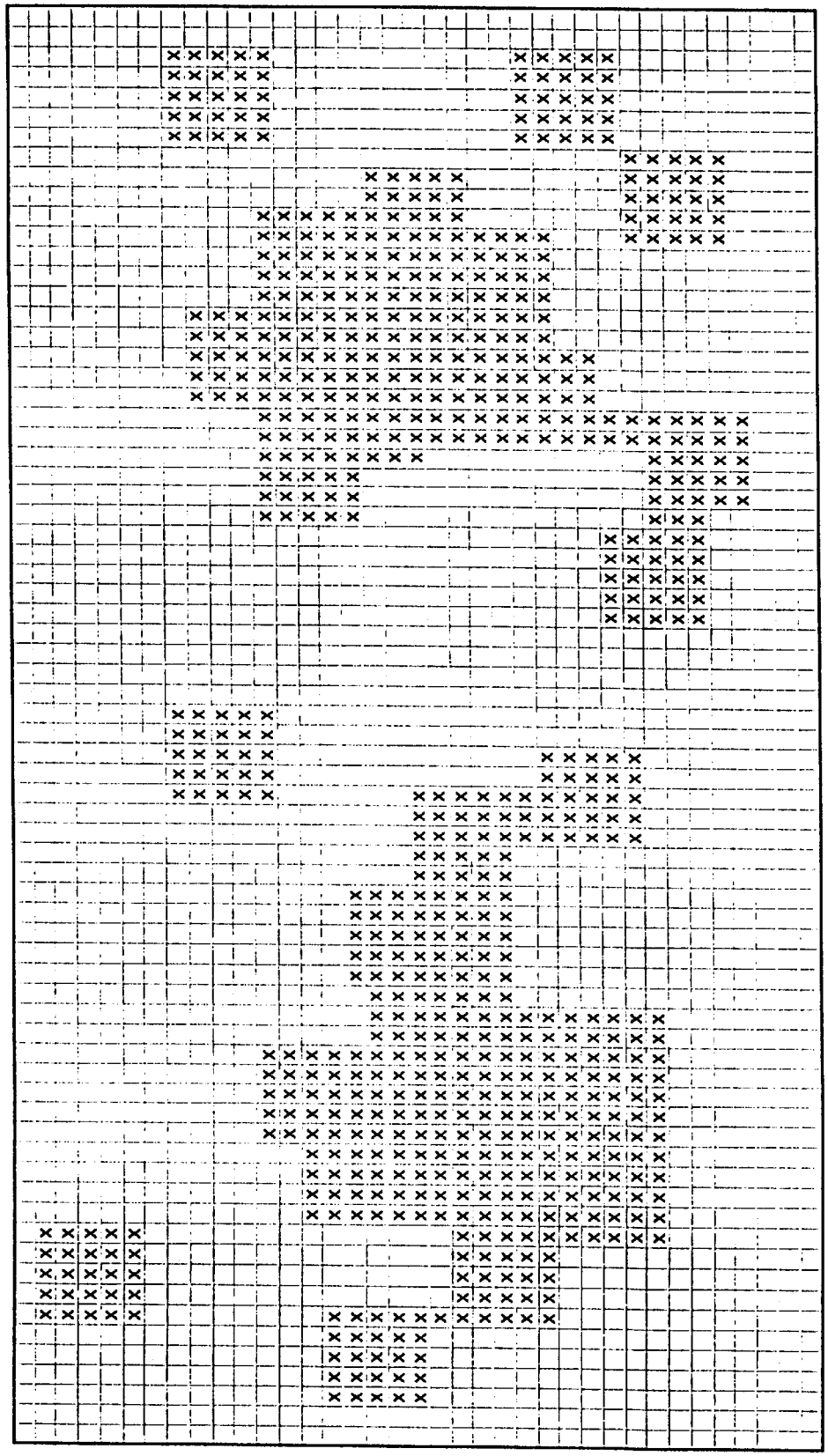
Figure 4F:
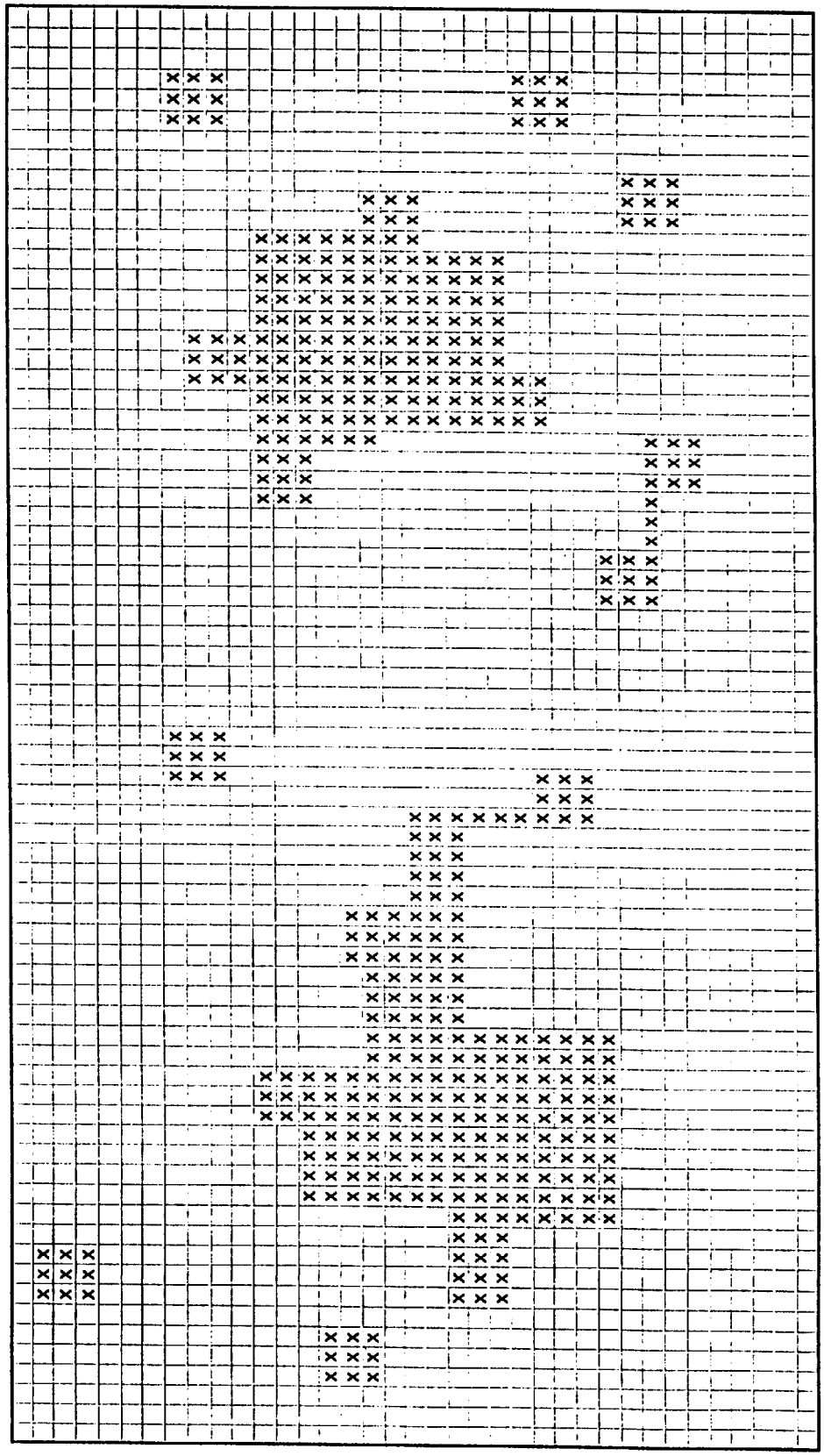
Figure 4G:
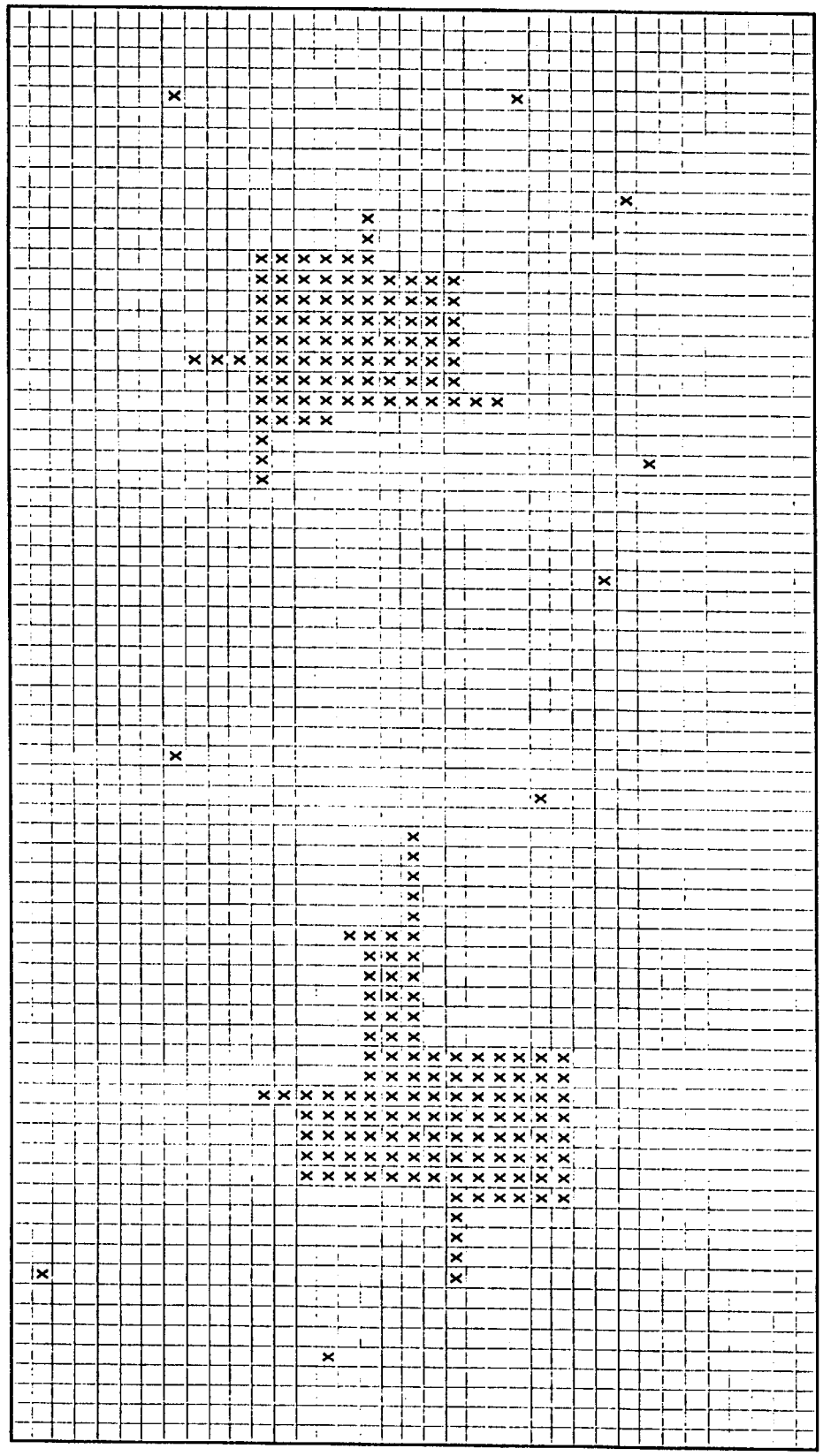

Data from the grid of cells are input to the clustering process over line 20 to a first morphological "dilate" operation, as shown in block 22. As briefly alluded to above, in the dilate operation each cell in the grid is examined and is turned "on" if any of its adjacent neighbors is already "on." Cells containing a "1" will be considered to be "on" and all other cells considered to be "off," although it will be understood that the opposite convention could have been employed. FIG. 4B shows the effect of the first dilate operation. Each potential cluster of data points has been expanded in area. Single isolated data points become 3×3 squares. As indicated by the line 24 in FIG. 1, the dilate step 22 is performed repeatedly a total of M times, where M is a user-selected integer. In the example provided in FIGS. 4A–4K, the dilate step 22 is performed three times, and the results of the second and third dilate operations are illustrated in FIGS. 4C and 4D, respectively. By this stage two potential clusters of data points have clearly emerged and at least three other regions remain isolated from the main clusters. Basically, the function of this first stage of dilate operations is to merge adjacent data points and to define, at least preliminarily, the extent of the clusters.

Figure 4H:
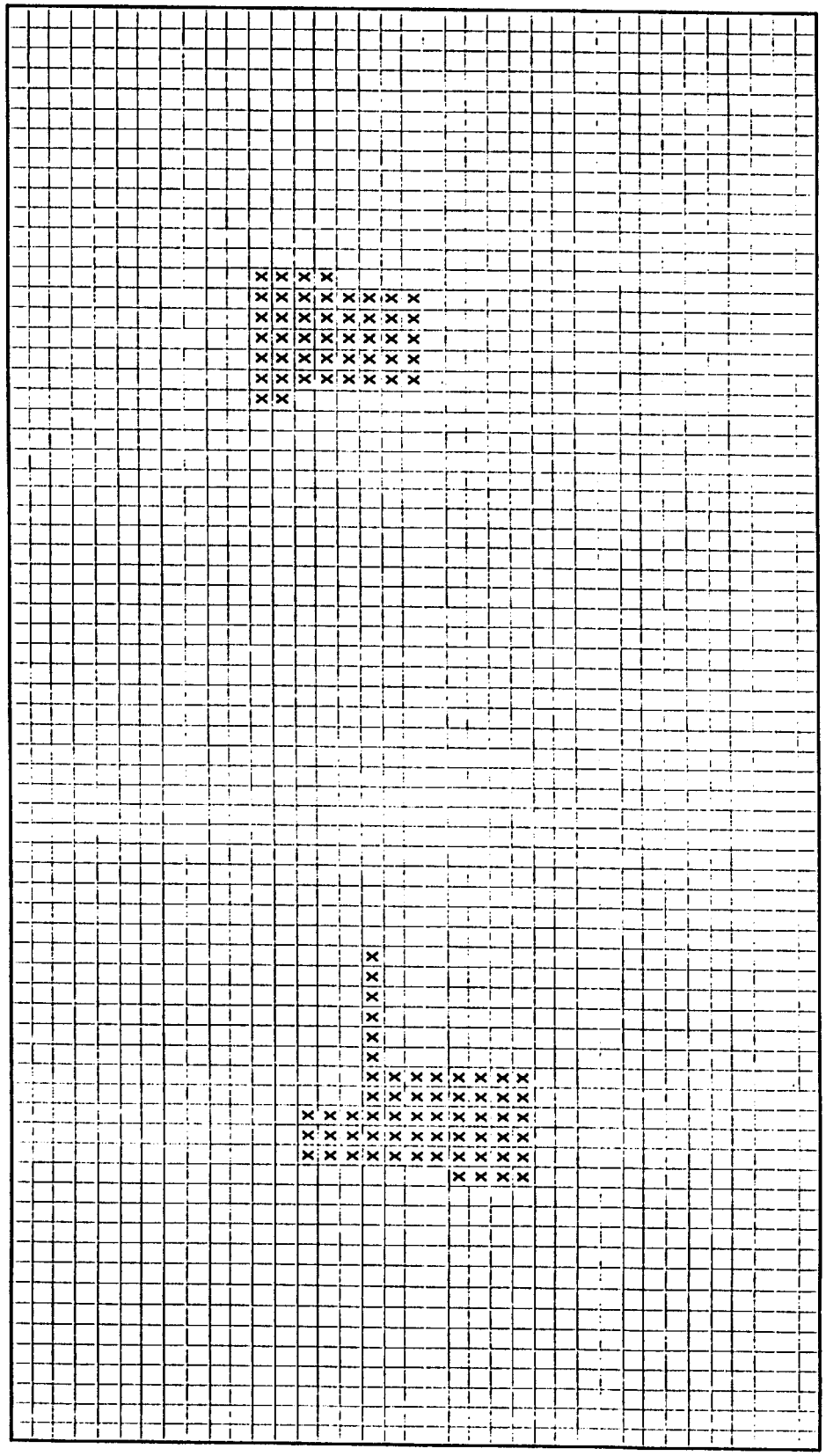
Figure 4I:
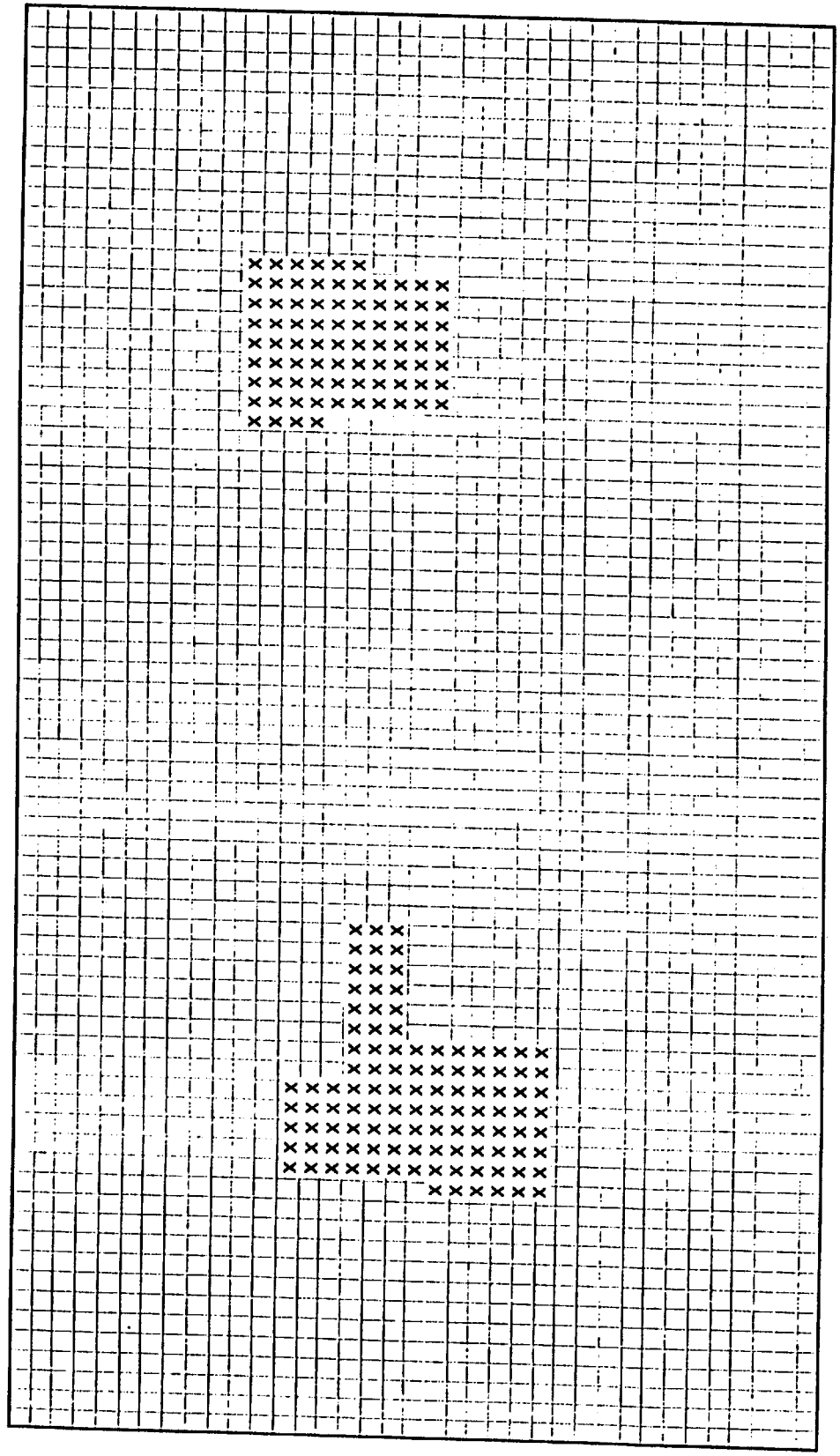
Figure 4J:
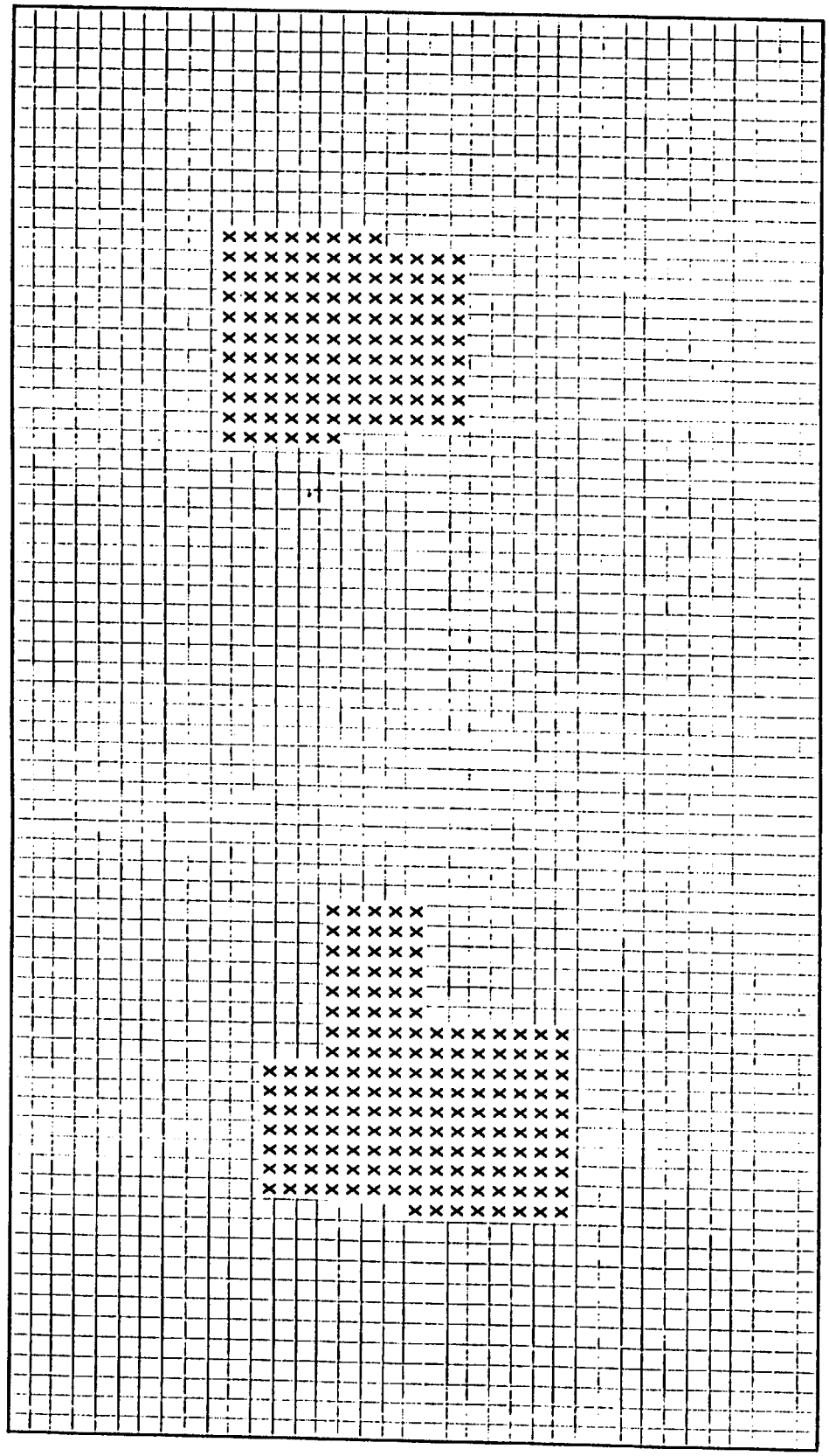
Figure 4K:
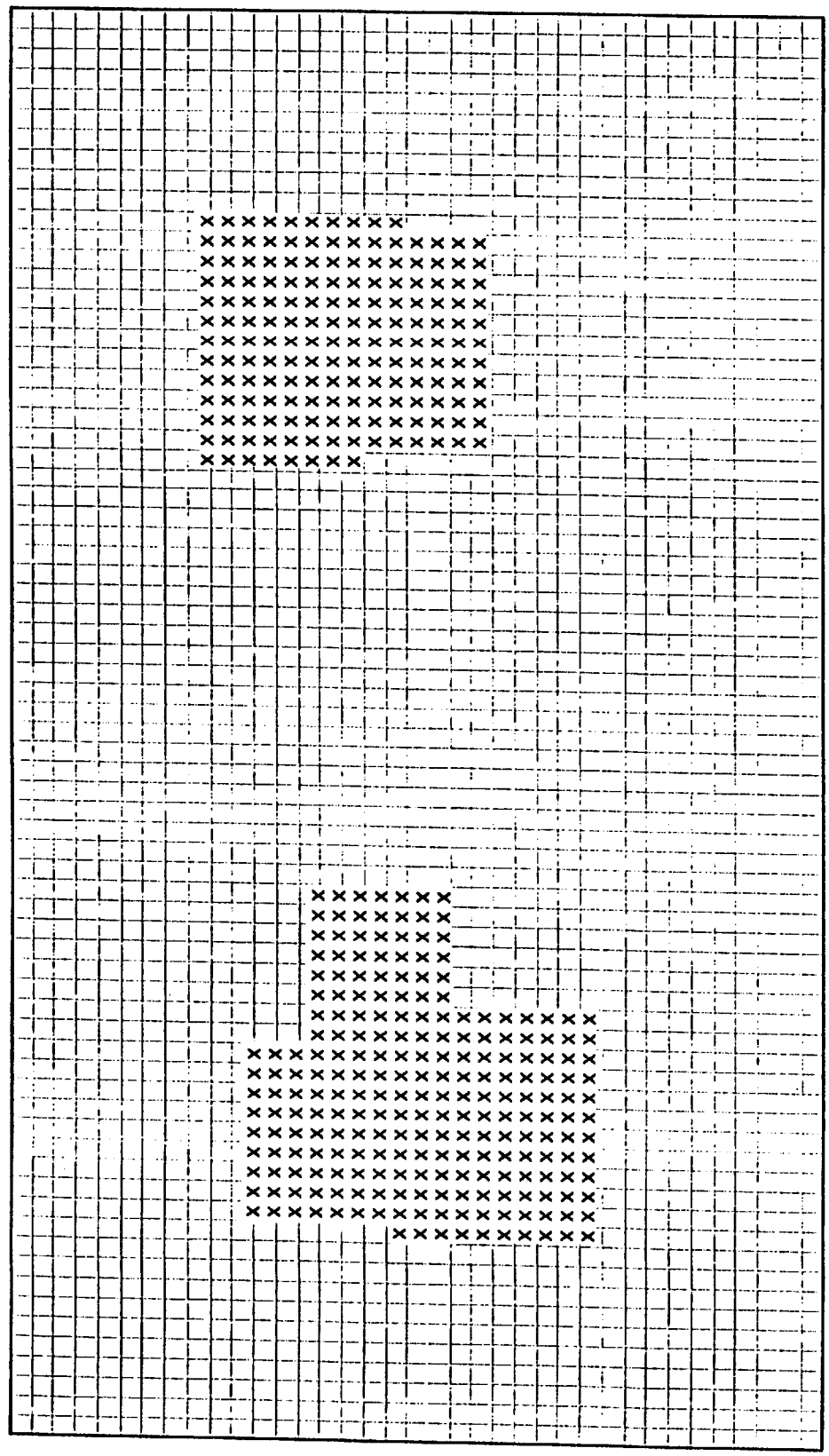

Next, a sequence of erode operations is performed, as indicated by block 26 and line 28. In each erode operation, each cell is turned "off" if any of its adjacent neighbors is in the "off" condition. The erode operation is performed one more time than the number of dilate operations that were performed in block 22. Thus, in this example, the erode operation is performed four successive times, and the results are indicated in FIGS. 4E–4H, respectively. The function of the erode operations is to eliminate the isolated smaller regions, referred to in this description as "outliers," and to eliminate any connections between adjacent clusters. As indicated in FIG. 4H, two cluster regions are now clearly evident, but they are much smaller than the regions encompassing data points from which the clusters were originally derived. Finally, a sequence of dilate operations is performed, as indicated by block 30 and line 32, to compensate for any cluster fragmenting caused by the erosion process. In this example, the dilate procedure 30 is performed three successive times, but in general the preferred number is dilation steps at this stage should be the same as the number of erosion steps in step 26.

Although the outline of cluster boundaries may be apparent to a human observer of the data grid plotted in readable form, an automatic procedure must be used to group cells that are in the "on" condition in specific clusters and then to assign each data point to an appropriate cluster. The procedure includes the following steps:

1) The data grid is scanned in raster fashion to locate "on" cells. The first "on" cell located is assigned to a first cluster. In effect, the located cells are labeled as belonging to the first cluster.

2) Each subsequent "on" cell is examined to determine if any adjacent cell has already been assigned to a cell. If so, the cell being examined is assigned to the same cluster as the cell or cells already assigned. If not, the cell being examined as assigned to, or labeled as belonging to, a different cluster. Thus, the clusters are defined in the data grid, as indicated in block 34 of FIG. 1.

3) Each original data point is examined to determine whether it falls within a defined cluster region in the data grid. If so, the data point is assigned to, or labeled as belonging to that cluster. If not, the data point is either assigned to the closest cluster or is eliminated, at the user's option. This process is referred to in FIG. 1 as mapping the cells to data points, as indicated in block 36, and associating ungrouped data points to nearest clusters, as indicated in block 38. Data points pertaining to newly acquired data may be similarly treated, as indicated in block 40, or may, of course, be used to reexamine all the data points to identify clusters.

Figure 2:
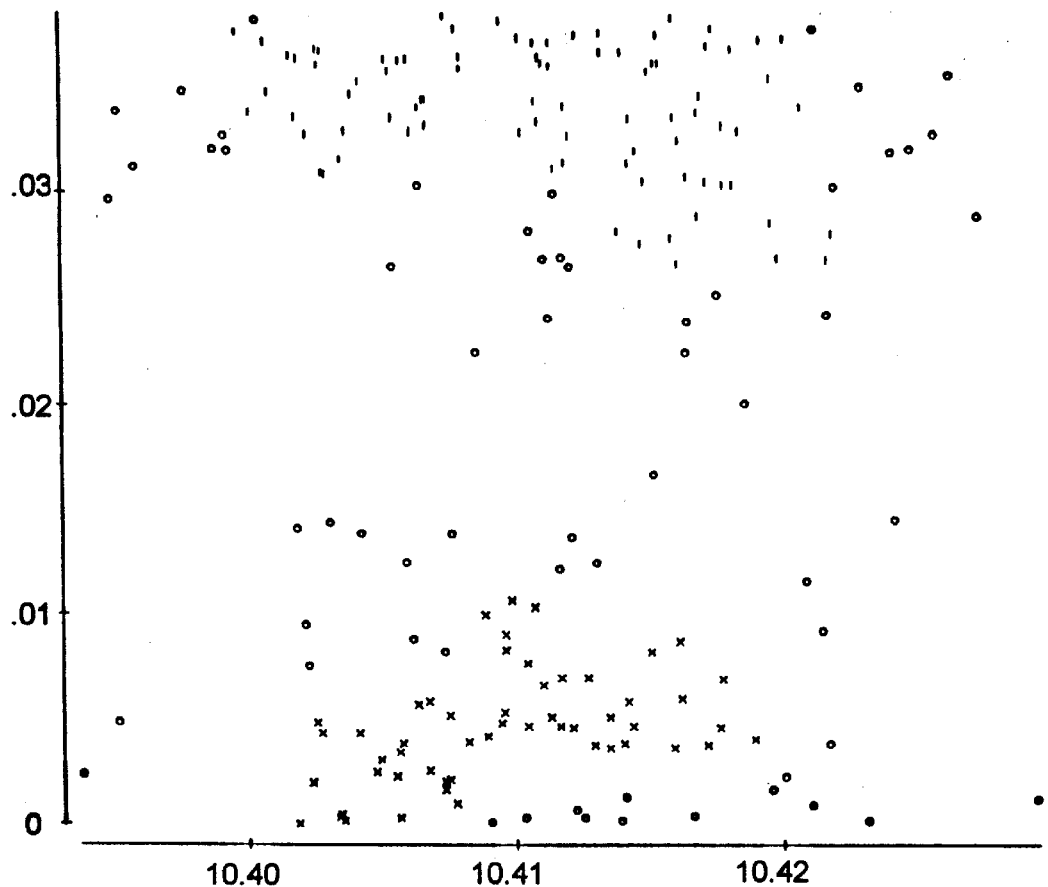
FIG. 2 is a graph showing the result of the morphological clustering technique of the invention as applied to data in two dimensions defining signal emitters.

FIG. 2 is an illustrative result of the morphological clustering method of the invention. The X and Y axes of the graph indicate two separate parameters used to measure and categorize signal emitters. The points indicated by the symbol "o" are not assigned to a cluster and are treated as outliers. The two clusters are identified by assigning the symbols "x" and "l" to the respective points of the clusters.

Figure 3:
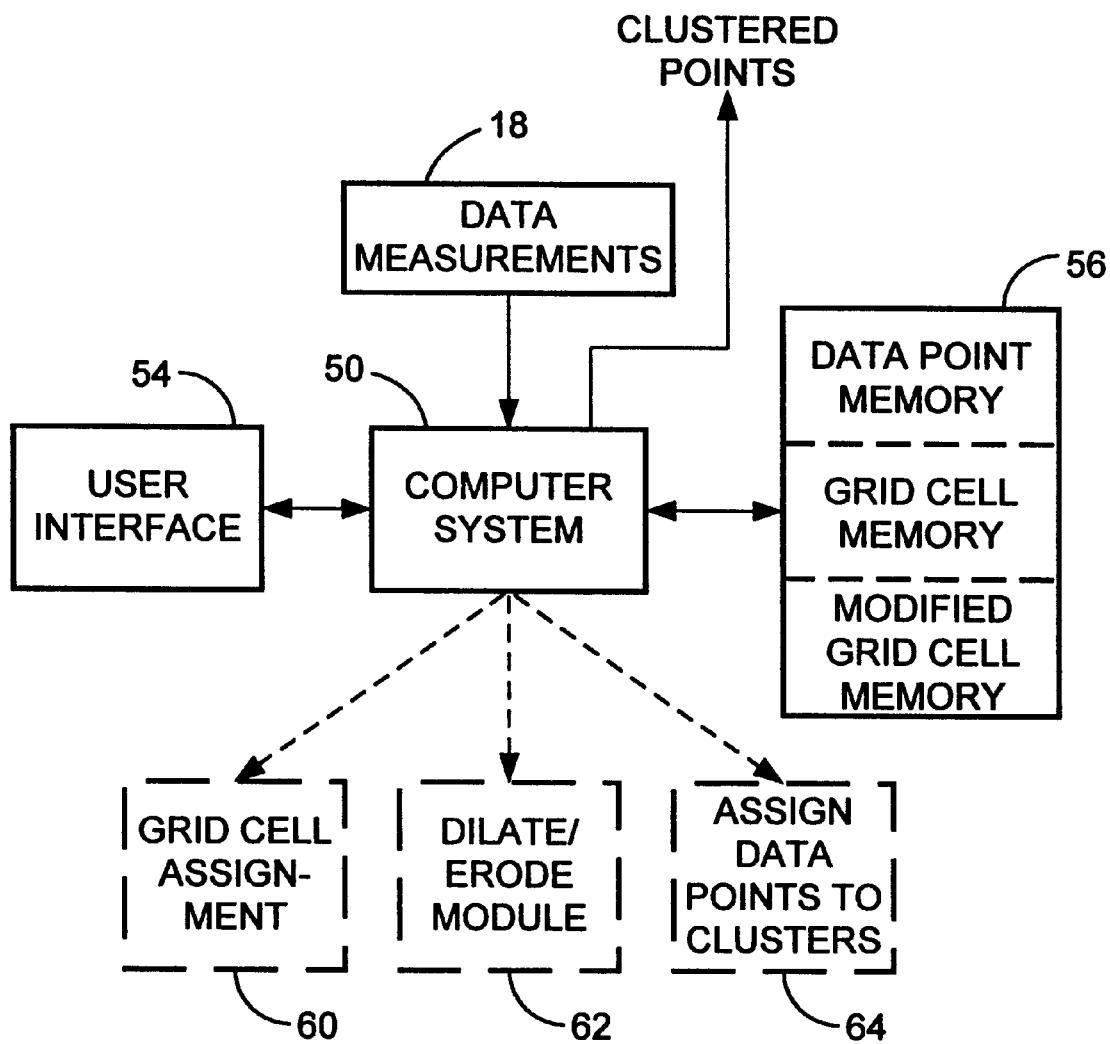
FIG. 3 is a simplified diagram of hardware for implementing the method shown in FIG. 1.

FIG. 3 shows in simplified form the principal system hardware components needed to practice the present invention. The hardware includes a computer system 50 into which the data measurements 52 are input, a user interface 54 for controlling the system and inputting various user options, and a memory 56 that includes one section for data point storage, another for storing the grid cells and another for storing the modified grid cells during and after morphological processing. The computer system 50 includes a grid cell assignment module 60, a dilate/erode module 62 and a module 64 for assigning data points to clusters. These modules may be software modules or may be hard-wired modules, depending on specific design requirements.

The morphological clustering technique of the present invention has significant advantages over clustering methods of the prior art. Not only can the invention handle large numbers of non-overlapping but very close clusters, but it does so without requiring knowledge of the number of clusters, as some methods do. In fact, because the number of clusters is a by-product of the method, for some applications the method may be used for this information alone, in conjunction with a conventional clustering technique that requires knowledge of the number of clusters. Another advantage of the method of the present invention is that it does not require large numbers of input samples or data points in order to reach a solution, as some methods do. Yet another advantage is that the morphological clustering method operates well even for higher numbers of axes or dimensions of the input data. Some conventional methods have more difficulty reaching a solution as the number of dimensions is increased. The only drawback in this regard is that the number of computations and the memory requirements increase in proportion to a power of the number of dimensions. Therefore, as practical matter the invention operates best on data having somewhere between two and four dimensions. Finally, the computation time in the present invention does not increase in proportion to a power of the number of data points. Instead, the computation time in morphological clustering increases in proportion to the product of the number data points and the number of clusters.

Figure 5:
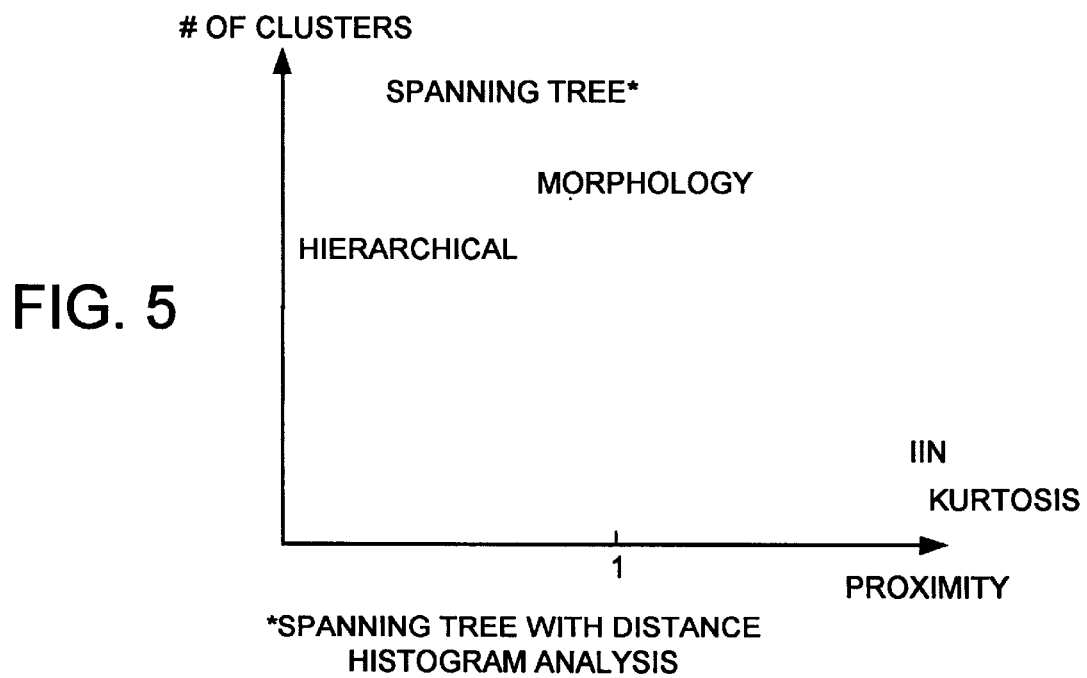
FIG. 5 is a graph comparing the morphological clustering method of the invention with clustering methods of the prior art, in terms of the number of clusters that can be handled and the proximity of the clusters.

FIG. 5 shows in diagrammatic form how morphological clustering compares with conventional methods in terms of the number of clusters handled and the relative proximity of the clusters. The horizontal axis measures cluster proximity, with the ability to handle closer clusters being indicated further to the right on this axis. The vertical axis indicates the relative number of clusters that can be handled. The present invention was conceived to address a clustering problem in which there were as many as hundreds of clusters to identify, with many of them in close proximity but not overlapping to a large degree. The only existing algorithms that could handle very close and overlapping clusters could not handle very many clusters. IIN is a hybrid method that employs the expectation-maximization algorithm internally. Other algorithms may make use of kurtosis, which is a statistical measure of spread related to the fourth central moment. At the other end of the number-of-clusters-versus-proximity diagram, the available algorithms include hierarchical methods and spanning tree methods. These can process larger numbers of clusters so long as they are well separated spatially. Morphological clustering does not provide the proximity performance of expectation-maximization and related methods, but will identify clusters that are closer together than those handled by spanning tree methods, and can also identify and separate large numbers of clusters.

The reasons that morphological clustering works as well as it does are related to the nature of morphological processing as distinguished from other data processing methods. In general, morphological processing has several attractive properties. For instance, it works on a local level and does not require a parametric model of the data. Nor does it require setting many parameters.

The cluster information that morphological processing operates on is data density, which is a property that is easily perceptible to the human observer. Based on density, the human observer can easily separate overlapping clusters by recognizing unique high-density cores of the clusters. Morphology goes beyond the density concept and senses dense cores, yet is not misled by very close outlying points in the grid. Another way of explaining why morphology works so well in clustering is to consider that morphology and the human observer both use second order information, unlike most other clustering algorithms. First order information is the character of each point in relation to its surrounding environment. Second order information includes the first order information of each point but also captures the first order information of the surrounding points. In morphological clustering, this information is exchanged implicitly between points because the reaction of each point to the morphological operators depends on how the surrounding points respond.

Although there are a few clustering algorithms that can use second order information, they are severely limited in that they require knowledge of the number of clusters before they can process the data. These algorithms operate by repositioning data points in some manner with respect to a cluster center point, which has to be known in advance. One of the most important advantages of morphological clustering is that it utilizes second order information without knowing either the number or the location of clusters. Since finding the number of clusters is a problem as difficult as performing the clustering method, the invention provides an extremely powerful method of determining the number of clusters. Because the number of clusters does not have to be known, the invention can process large numbers of clusters without difficulty.

It will be appreciated from the foregoing that the present invention represents a significant advance in statistical clustering methods for use in a variety of applications. In particular, the invention automatically identifies clusters from a number of data samples or data points in a multidimensional grid. The invention is especially important in applications in which the clusters may be in close proximity and in which there may be large numbers of clusters. It will also be appreciated that, although the invention has been described in detail for purposes of illustration, various modifications may be made without departing from the spirit and scope of the invention. Accordingly, the invention should not be limited except as by the appended claims.

What is claimed is:

1. A method for automatically identifying clusters in samples of multivariate statistical data, comprising the steps of:

storing the data in the form of a grid of data cells, wherein each of the data cells is switchable to a state representing a data point, and wherein the grid has as many dimensions as the multivariate statistical data; and performing multiple morphological operations on the grid of data cells to identify one or more clusters of data, wherein the step of performing multiple morphological operations includes performing a combination of multiple erosion and dilation steps to determine boundaries of well-defined clusters of data points and to eliminate smaller isolated clusters, wherein data points falling within the boundaries of a cluster are said to belong to that cluster.

2. A method for automatically identifying clusters in samples of multivariate statistical data, comprising the steps of:

storing the data in the form of a grid of data cells, wherein each of the data cells is switchable to a state representing a data point, and wherein the grid has as many dimensions as the multivariate statistical data; and performing multiple morphological operations on the grid of data cells to identify one or more clusters of data, wherein the step of performing multiple morphological operations includes:

performing multiple dilation steps to expand contiguous regions of the grid covered by data points until adjacent sub-regions merge into larger regions identified as potential clusters;

then performing multiple erosion steps to shrink the potential clusters until isolated smaller ones are eliminated and thin linkages between other potential clusters are removed; and then performing further multiple dilation steps to reconnect any potential clusters that were fragmented by the previous step, to leave clusters of data cells, wherein data points falling within the boundaries of a cluster are said to belong to that cluster.

3. A method as defined in claim 2, wherein:

each dilation step includes turning each data cell to an "on" condition if any immediately adjacent neighbor cell is already in the "on" condition; and each erosion step includes turning each data cell to an "off" condition if any immediately adjacent neighbor cell is already in the "off" condition.

4. A method as defined in claim 3, wherein:

the step of performing multiple dilation steps includes performing M such steps;

the step of performing multiple erosion steps includes performing M+1 such steps; and the step of performing further multiple dilation steps includes performing N such steps.

5. A method as defined in claim 4, wherein M is 3 and N is 4.

6. A method as defined in claim 2, and further comprising the steps of:

identifying the data cells in each cluster; and identifying data points that fall within the boundaries of each cluster.

7. A method as defined in claim 6, and further comprising the step of:

assigning data points pertaining to newly acquired data to clusters.

8. A method for automatically categorizing samples of multivariate statistical data based on whether the samples fall into clusters, the method comprising the steps of:

storing data samples in the form of a multidimensional grid of data cells, wherein each of the data cells is switchable to a state representing a data point by its position in the grid;

performing multiple morphological dilation steps to expand contiguous regions of the grid covered by data points, until adjacent regions merge into larger regions identified as potential cluster regions;

then performing multiple morphological erosion steps to shrink the potential cluster regions until smaller ones are eliminated and thin linkages between other potential cluster regions are removed; and then performing further multiple morphological dilation steps to reconnect any potential cluster regions that were fragmented by the previous step, leaving clusters of data cells, wherein data points falling within the boundaries of a cluster are said to belong to that cluster and to share at least some common attributes.

9. A method as defined in claim 8, and further comprising the steps of:

labeling the data cells in each cluster as belonging to that cluster; and labeling data points that fall within the boundaries of a cluster as belonging to that cluster.

10. A method as defined in claim 8, wherein:

each data point is represented by a data cell in an "on" condition;

each dilation step includes turning each data cell to the "on" condition if any immediately adjacent neighbor data cell is already in the "on" condition; and each erosion step includes turning each data cell to an "off" condition if any immediately adjacent neighbor data cell is already in the "off" condition.

11. A method as defined in claim 10, wherein:

the step of performing multiple dilation steps includes performing M such steps;

the step of performing multiple erosion steps includes performing M+1 such steps; and the step of performing further multiple dilation steps includes performing N such steps.

12. A method as defined in claim 11, wherein M is 3 and N is 4.

13. A system for automatically identifying clusters in samples of multivariate statistical data, comprising:

a memory for storing multivariate statistical data in the form of a logical multidimensional grid of data cells, wherein each of the data cells is switchable to a state representing a sample data point, and wherein the position of the data cell in the multidimensional grid represents multiple dimensions of the data point; and a processor programmed to perform multiple morphological operations on the grid of data cells and to thereby identify one or more clusters of data, wherein the processor programmed to perform multiple morphological operations includes a morphological processing module for performing a combination of multiple erosion and dilation steps to determine boundaries of well-defined clusters of data points and to eliminate smaller isolated clusters, wherein data points falling within the boundaries of a cluster are said to belong to that cluster.

14. A system for automatically identifying clusters in samples of multivariate statistical data, comprising:

a memory for storing multivariate statistical data in the form of a logical multidimensional grid of data cells, wherein each of the data cells is switchable to a state representing a sample data point, and wherein the position of the data cell in the multidimensional and represents multiple dimensions of the data point; and a processor programmed to perform multiple morphological operations on the grid of data cells and to thereby identify one or more clusters of data, wherein the processor programmed to perform multiple morphological operations includes:

a first morphological processing module, for performing multiple dilation steps to expand contiguous regions of the grid encompassed by data points until adjacent sub-regions merge into larger regions identified as potential cluster regions;

a second morphological processing module, for performing multiple erosion steps to shrink the potential cluster regions until isolated smaller regions are eliminated and thin linkages between other potential cluster regions are removed; and a third morphological processing module, for performing further multiple dilation steps to reconnect any potential cluster regions that were fragmented by the second morphological processing module, to leave clusters of data cells, wherein data points falling within the boundaries of a cluster are said to belong to that cluster.

15. A system as defined in claim 14, and further comprising:

a processing module for locating each data cell that falls within the boundary of each cluster, and labeling appropriate data cells as falling within the clusters; and another processing module, for identifying each data point within the boundaries of a cluster as belonging to that cluster.

16. A system as defined in claim 15, and further comprising:

yet another processing module, for determining whether data cells not belonging to a cluster should be eliminated from consideration or assigned to a nearby cluster.

* * * * *